(12) United States Patent
Than et al.

(10) Patent No.: US 6,343,698 B1
(45) Date of Patent: Feb. 5, 2002

(54) SEISMIC PROTECTION SYSTEM FOR A CLARIFIER FEEDWELL IN A WASTEWATER TREATMENT SYSTEM

(76) Inventors: Ba T. Than, 2343 Mark Twain Dr., Antioch, CA (US) 94509; Ann E. Farrell, 1575 Rancho View Dr., Lafayette, CA (US) 94549; William E. Brennan, 1062 Village Oaks Dr., Martinez, CA (US) 94553; Kenneth S. Clark, 4004 Carla Ct., Antioch, CA (US) 94509; Munawar Husain, 246 La Salle, Piedmont, CA (US) 94610; Gary A. Aron, 3060 Cafeto Dr., Walnut Creek, CA (US) 94598; Kevin H. Monroe, 365 Oakcliff Rd., Monrovia, CA (US) 91016

( * ) Notice: Subject to any disclaimer, the term of this patent is extended or adjusted under 35 U.S.C. 154(b) by 0 days.

(21) Appl. No.: 09/636,096

(22) Filed: Aug. 10, 2000

(51) Int. Cl.⁷ ............................................... B01D 21/24
(52) U.S. Cl. ...................... 210/519; 210/520; 210/528; 210/541
(58) Field of Search ................................. 210/519, 520, 210/528, 529, 530, 531, 541

(56) References Cited

U.S. PATENT DOCUMENTS 2,205,199 A * 6/1940 Hubbell et al. ............. 210/520
3,486,628 A * 12/1969 Darby ........................ 210/520
3,539,051 A * 11/1970 Stone ......................... 210/528

OTHER PUBLICATIONS

Central Contra Costa Sanitary District, Martinez, California, Contract Documents for Treatment Plant Seismic Upgrade Project, Sep. 1998, vol. 1, BID Documents Bidding Conditions & Requirements, vol. 2, Project Manual, Contract Forms, Conditions & Specifications, and vol. 3, Project Drawings for Construction of District Project No. 7144.

* cited by examiner

Primary Examiner—Christopher Upton
(74) Attorney, Agent, or Firm—Skjerven Morrill MacPherson LLP; David E. Steuber

(57) ABSTRACT

A clarifier feedwell having a seismic protection system. The clarifier feedwell includes a feedwell frame and at least one pressure relief door which is slidably inserted into the feedwell frame. The pressure relief door includes a supporting frame, the supporting frame defining an opening. A flexible panel is disposed in the opening. A first edge of the panel is attached to a first portion of the supporting frame. The remaining edges of the panel are releasably engaged with other portions of the supporting frame such that the panel occupies substantially the entire area of the opening. At least one stiffening frame is disposed on the panel. The stiffening frame increases the rigidity of the panel, so that the panel does not disengage from portions of the supporting frame under a normal hydrodynamic load. However, under a sudden high magnitude hydrodynamic load, the flexible panel disengages from selected portions of the supporting frame, allowing water to pass through the clarifier feedwell without damaging it.

17 Claims, 3 Drawing Sheets

SEISMIC PROTECTION SYSTEM FOR A CLARIFIER FEEDWELL IN A WASTEWATER TREATMENT SYSTEM

FIELD OF THE INVENTION

This invention relates to seismic event protection systems, and more particularly, to systems for protecting clarifier feedwells containing water or wastewater from sudden hydrodynamic loading events resulting from seismic activity.

BACKGROUND

In those parts of the world where seismic activity is common, there is increasing concern about the effects of earthquakes on the infrastructure supporting communities, including water and wastewater treatment facilities. Earthquakes can cause structural damage to hydraulic systems at water or wastewater treatment facilities, by rupturing or otherwise damaging piping and/or equipment. These hydraulic systems, once damaged, can take months to repair or replace. In the meantime, the community affected by the earthquake may be forced to permit sewage to discharge to receiving waters untreated, posing significant burdens on the public health and the environment.

One example of a hydraulic system in a water or wastewater treatment facility is a clarifier. A clarifier is a quiescent basin or tank through which a water or wastewater is passed for removal of suspended solids (typically called "primary" clarifiers) and removal of biological flocs in activated sludge (typically called final, or "secondary" clarifiers) by gravitational settling. The removal of settleable suspended solids by this method is known as clarification, or alternately, sedimentation. FIG. 1 shows a cutaway view of a circular secondary clarifier in accordance with the prior art. Influent wastewater to be treated enters the clarifier via an influent pipe 8 which runs underneath the clarifier 10, rises at the center, and discharges at the inlet well 12 at a high velocity. As the water spills over inlet well 12 to feedwell 14, its velocity is significantly reduced. Water then underflows feedwell 14 and flows radially outward toward the wall 15 of clarifier 10. Feedwell 14 has sludge rakes 16 attached to it, and slowly rotates as it operates, being driven by a drive unit (not shown). The sludge rakes 16 are mounted in pairs, with each pair forming a vee (V) in plan view. As sludge rakes 16 move, the sludge which accumulates at the bottom of clarifier 10 is collected in each vee and removed by uptake sludge pipes 17 mounted above sludge rakes 16. The sludge is discharged from sludge pipes 17 into a sludge box (not shown) in the center of clarifier 10. The sludge is discharged from the sludge box by pumping. The treated water spills over overflow weir 20 into clarified effluent channel 22. The clarified effluent is then further treated by other processes downstream.

Clarifiers may hold very large volumes of water or wastewater, with diameters of between 50 and 60 feet and heights between 8 and 12 feet being common. Consequently, if the volume of water in a clarifier is suddenly shifted, as may be caused by seismic activity, a large hydrodynamic load may result. Typically, seismic activity generates a wave within the clarifier. When the wave hits the feedwell within the clarifier (the feedwell typically being constructed of solid steel), it hits the feedwell with such force that the feedwell and the sludge rakes attached to the feedwell actually undergo plastic deformation, becoming a twisted mass of steel. The drive unit for the feedwell is also typically destroyed. As a result, the wastewater treatment facility cannot remove solids from incoming wastewater until the clarifier is repaired.

To get the clarifier back in service after an earthquake, the clarifier must be entirely drained, the feedwell and sludge rakes replaced and the drive unit repaired or replaced, as appropriate. This process may take several weeks or even months. In the meantime, the water or wastewater treatment facility has no ability to produce a sludge from the influent wastewater stream, and wastewater from the facility will be discharged to a receiving water body untreated.

Seismic protection systems of which Applicants are aware include two commercially available feedwells. In the first commercially available feedwell, the feedwell is constructed of stainless steel mesh, rather than solid steel. Even during normal operation conditions, this feedwell does not operate as well as a solid steel feedwell, because as the stainless steel mesh feedwell rotates, the stainless steel mesh vibrates, creating turbulence in the water inside the feedwell. This turbulence radiates outward toward the wall of the clarifier, which prevents the sludge from settling properly within the clarifier. While this feedwell will not undergo plastic deformation as a result of the hydrodynamic load due to a seismic event (since the wave of water hitting the mesh will simply pass through it), it does not function well as part of a sedimentation basin for water and wastewater treatment systems.

In another commercially available feedwell, the feedwell is constructed of a very brittle material, such as fiberglass. During normal operating conditions, this feedwell works as well as a solid steel feedwell from the standpoint of sedimentation. If this feedwell experiences a sudden, high magnitude hydrodynamic load due to a seismic event, rather than undergoing plastic deformation, the feedwell simply shatters in place, with the shattered material sinking to the bottom of the clarifier. However, to get a clarifier having this feedwell back in service following a seismic event, the clarifier must be drained down, the shattered material must be removed, and a replacement feedwell must be purchased and installed. This process may take weeks or months to complete, just as with a solid steel feedwell.

Clearly there is a need for a feedwell design which can withstand high magnitude hydrodynamic loads resulting from seismic activity, such that the clarifier may quickly be brought back into service, so as to protect the public health, and to minimize the effects of seismic activity on the operational capacity of a water or wastewater treatment system, and on the environment of the receiving water receiving the effluent from the treatment system.

SUMMARY

A clarifier feedwell having a seismic protection system is described. The clarifier feedwell includes a feedwell frame and at least one pressure relief door which is slidably inserted into the feedwell frame. The pressure relief door includes a supporting frame, the supporting frame defining an opening. A flexible panel is disposed in the opening. A first edge of the panel is attached to a first portion of the supporting frame. The remaining edges of the panel are releasably engaged with other portions of the supporting frame such that the panel occupies substantially the entire area of the opening. At least one stiffening frame is disposed on the panel. The stiffening frame increases the rigidity of the panel, so that the panel does not disengage from portions of the supporting frame under a normal hydrodynamic load. However, under a sudden high magnitude hydrodynamic load, the flexible panel disengages from selected portions of the supporting frame, allowing water to pass through the clarifier feedwell without damaging it. In one embodiment, the pressure relief door and the panel are rectangular.

DETAILED DESCRIPTION

Figure 1:
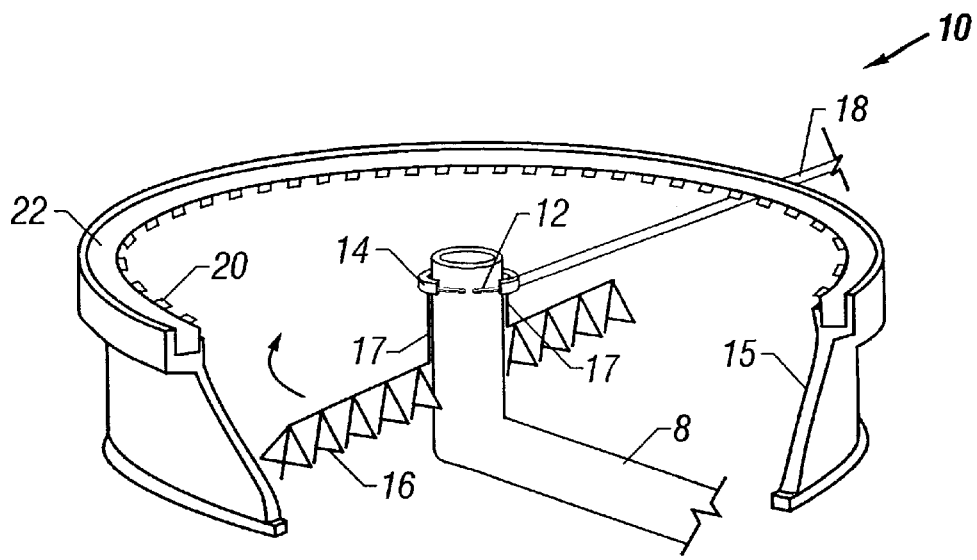
FIG. 1 illustrates a cutaway view of a circular secondary clarifier in accordance with the prior art.
Figure 2A:
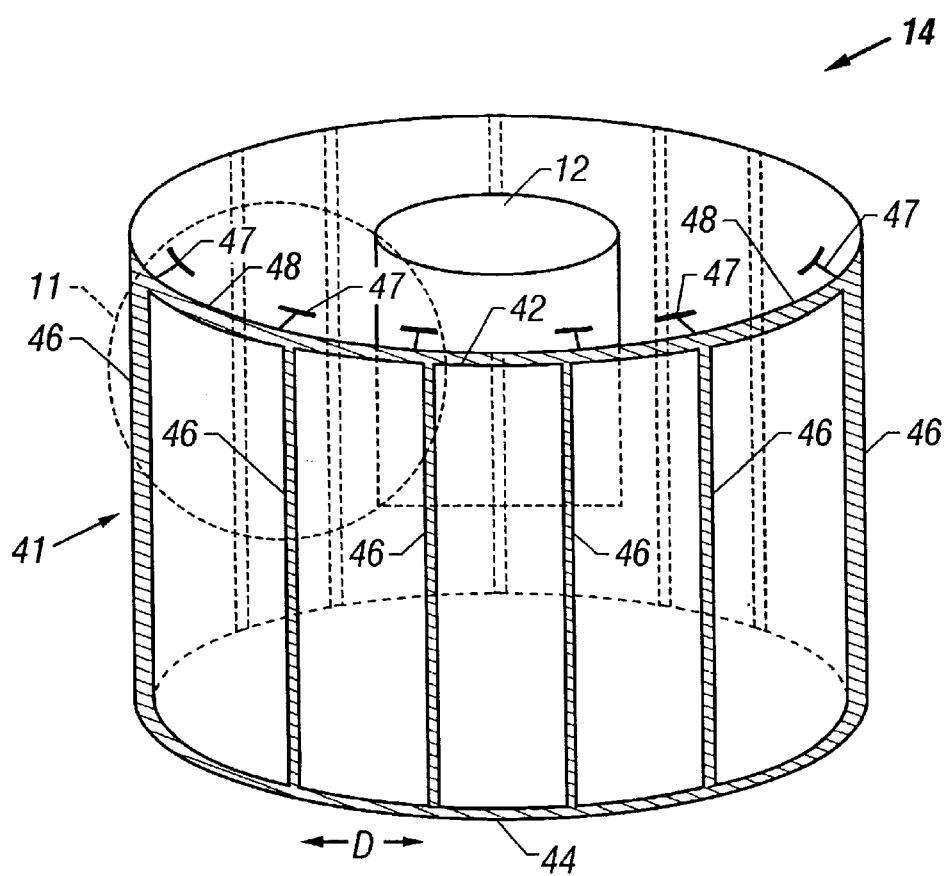
FIG. 2A is a side view of the tubular steel feedwell frame used to support and house pressure relief doors in accordance with the present invention.
Figure 2B:
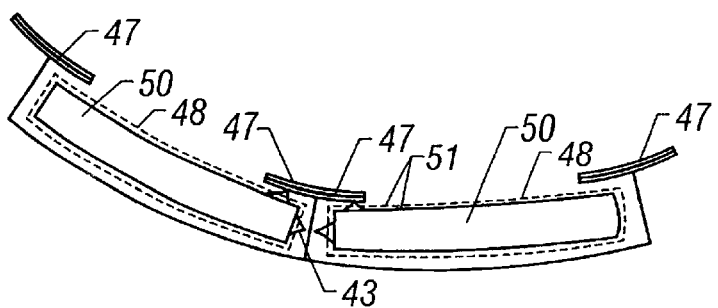
FIG. 2B is a more detailed view of area 11 FIG. 2A.

FIG. 2A illustrates a portion of the design of the feedwell in accordance with the present invention. Feedwell 14 contains an inlet well 12, as in the prior art. However, feedwell 14, rather than being constructed of solid steel, has a feedwell frame 41, which has a top member 42, and a bottom member 44. A plurality of vertical members 46 (some of which are shown in dashed outline in FIG. 2A), spaced apart from each other by a preselected distance D, join top member 42 to bottom member 44. Each vertical member 46 includes a guide channel 47 disposed along the interior of feedwell 14. As illustrated in FIG. 2B, each two adjacent guide channels 47 define a space 48 (shown in dashed outline) through which a pressure relief door 50 (described below) may be inserted within feedwell frame 41 (for clarity of presentation, only four guide channels 47 defining two spaces 48 are shown). Retaining springs 43 attached to supporting frame 51 (discussed below) are used to hold pressure relief doors 50 in place.

In one design that has operated successfully, vertical members 46 have been installed at four foot intervals around the circumference of the feedwell, the circumference being approximately eighty feet, for a total of twenty pressure relief doors installed within feedwell frame 41. The feedwell frame 41 may be made from, for example, type 316 tubular stainless steel.

Figure 3:
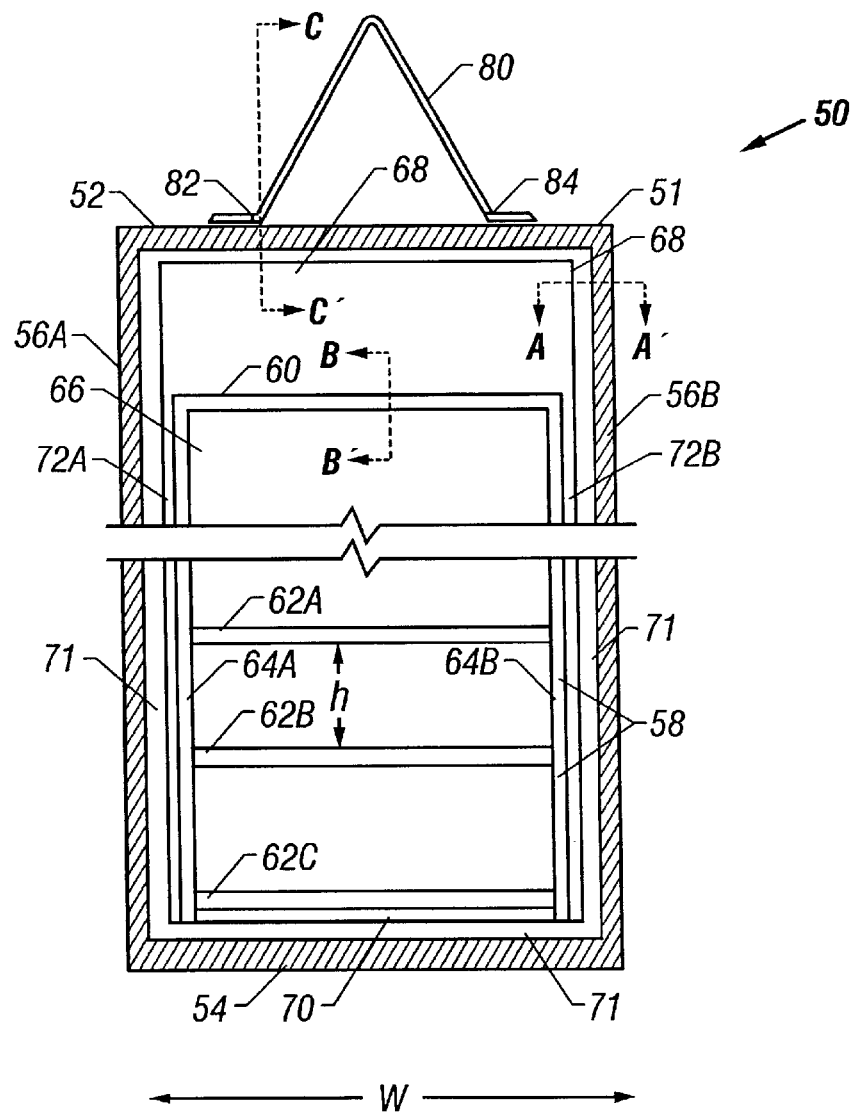
FIG. 3 is a side view of a pressure relief door in accordance with the present invention.

FIG. 3 is a side view of a pressure relief door 50 for a clarifier feedwell in accordance with an embodiment of the present invention. Pressure relief door 50 includes a supporting frame 51, the supporting frame 5 1 defining an opening, and having in one embodiment a top member 52, a bottom member 54, and lateral members 56A, 56B. The distance between the outer edges of lateral members 56A and 56B defines the width, W, of pressure relief door 50. Pressure relief door 50 further includes a flexible panel 66. Panel 66 has a top edge 68, a bottom edge 70, and side edges 72A, 72B. Disposed within supporting frame 51 and attached to flexible panel 66 is a plurality of stiffening frames 58. Each stiffening frame 58 has a top member 60, one or more bottom members (here shown with 3 bottom members: 62A, 62B, 62C), and vertical members 64A, 64B. In one embodiment, stiffening frames 58 are disposed in parallel with each other and with supporting frame 51. In the embodiment shown in FIG. 3, panel 66 and the opening defined by supporting frame 51 are rectangular.

In one embodiment, top edge 68 of panel 66 is attached to the top member 52 of supporting frame 51. Panel 66 extends downward through the bottom edge 62 of the bottommost stiffening frame 58, so that bottom edge 70 of panel 66 is releasably engaged by a seal member 71. Side edges 72A and 72B of panel 66 also extend beyond vertical members 64A, 64B of stiffening frames 58 and are also releasably engaged by seal members 71. However, the invention is not so limited, and includes any embodiment wherein a first edge of the panel is attached to one member of the supporting frame and the other edges of the panel are releasably engaged with other portions of the supporting frame.

Figure 4:
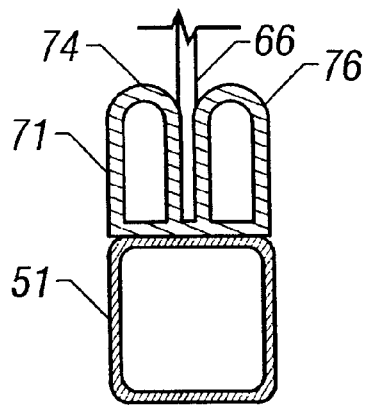
FIG. 4 is a cross-sectional view taken along line A–A' of FIG. 3.

FIG. 4 illustrates the engagement of panel 66 with each of the seal members 71, and the attachment of the seal member 71 to supporting frame 51. During installation, panel 66 is "tucked" into seal members 71 which are disposed along the bottom member 54 and lateral members 56A, 56B of supporting frame 51. The clearance between faces 74 and 76 of seal member 71 engaging panel 66 is limited to be no greater than the thickness of panel 66, so that faces 74 and 76 press against both sides of panel 66. In this embodiment. seal member 71 is made of neoprene and has a geometry Such that in cross-section it resembles a letter "B", and is available from West American Rubber Co., Inc. of Orange, Calif. Of course, other shapes are possible, so long as sufficient pressure is provided by seal members 71 to retain panel 66 in place under normal operating conditions. Other elastomers, such as Viton™, may also be used for seal member 71. Seal member 71 is attached to supporting frame 51 by a suitable underwater epoxy such as PANGOFOL™ available from Truflex/Pang Rubber Products Company of Los Angeles, Calif.

Supporting frame 51 and stiffening frames 58 may be made from, for example, type 316 stainless steel, for corrosion resistance. Tubular stainless steel is preferred for supporting frame 51, because it is strong, while still being lightweight. Panel 66 may be made from, for example, neoprene. Other elastomers, such as Viton™, may also be used for panel 66. In one embodiment that has been used with good results, panel 66 is made from a fabric-reinforced neoprene sheet that is 0.006 inches (60 mils) thick. Panel 66 is commercially available from West American Rubber Co., Inc. of Orange, Calif.

As illustrated in FIG. 3, pressure relief door 50 may optionally include a rod 80 attached to top member 52 of supporting frame 51. Rod 80 is used to cooperate with an external device (not shown), such as a hook attached to a winch, to remove pressure relief door 50 from feedwell 41. Removal of pressure relief door 50 from feedwell 41 is required after a seismic event to properly re-seat panel 66 within supporting frame 51, and is described in greater detail below. Rod 80 may be, for example, triangular in shape, as illustrated in FIG. 3, and is attached to supporting frame 51, by for example, two welds, 82 and 84.

Seal members 71 are an important component of the present invention, being both the means for engaging panel 66 with supporting frame 51 during normal operations, and the means for releasing panel 66 from supporting frame 51 when pressure relief door 50 is subjected to sudden, high magnitude hydrodynamic load as a result of an earthquake or other seismic activity. Preferably, the hardness values for seal members 71 and panel 66 are approximately equal. In one embodiment, seal members 71 and panel 66 have a durometer measurement (hardness) of 60 Shor A.

Figure 5:
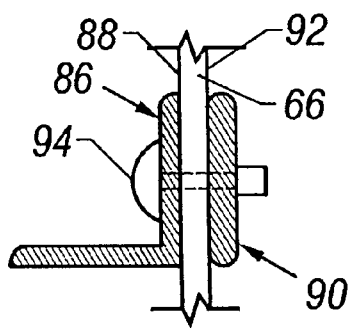
FIG. 5 is a cross-sectional view taken along the line B–B' of FIG. 3.

FIG. 5 illustrates the construction details for stiffening frame 58 viewed in cross-section. Stiffening frame 58 is also an important element in the invention, as it provides additional rigidity to panel 66 to withstand the normal hydrodynamic loads exerted on the pressure relief doors 50 of feedwell 14. Without stiffening frame 58, panel 66 may become disengaged from seal members 71 under normal operating conditions.

Construction details are typically identical for the top member 60, bottom members 62A, 62B, 62C, and vertical members 64A, 641 of stiffening frame 58. As shown in FIG. 5, stiffening frame 58 includes a channeled section 86 disposed on the outer surface 88 of panel 66, and a flat bar section 90 disposed on the inner surface 92 of panel 66. Channeled section 86 is fastened to flat bar section 90 by a fastener 94 through panel 66, which is disposed between channeled section 86 and flat bar section 90. Flat bar section 90 is useful to support installation of channeled section 86 on panel 66 by means of fastener 94. Without flat bar section 90, panel 66 may tend to crack. Channeled section 86, flat bar section 90, and fastener 94 are preferably fabricated from type 316 stainless steel. Channeled section 86 may be fastened to flat bar section 90 by any fastener known to those of ordinary skill in the art, but rivets and bolts are the preferred fasteners. In one embodiment, fasteners 94 are pop rivets having a diameter of $3/16$ inches, fabricated from type 316 stainless steel, and installed every 6 inches along the length of stiffening frame 58.

The height, h, of stiffening frames 58 (shown in FIG. 3) is an important parameter for proper operation of the pressure relief door. Applicants have found through testing that a pressure relief door having a width, W, of approximately four feet, a height of six feet, and a flexible panel 60 mils thick, the flexible panel 66 having stiffening frames one foot in height and 3.5 feet in width would operate as intended under a sudden, high magnitude hydrodynamic load. (i.e., panel 66 would disengage from seal members 71 along the bottom edge 54, and lateral members 56A and 56B of supporting frame 51, allowing passage of water through the feedwell without damaging the feedwell). However, an otherwise identical pressure relief door with stiffening frames 1.5 feet in height was found to be insufficiently rigid under a normal hydrodynamic load. That is, panel 66 disengaged front seal members 71 under normal operating conditions, which would undesirably disturb the sedimentation process. The correct dimensions of the stiffening frame depend on the size of the pressure relief door, the flexibility of panel 66 and other factors and are determined through appropriate testing.

Figure 6:
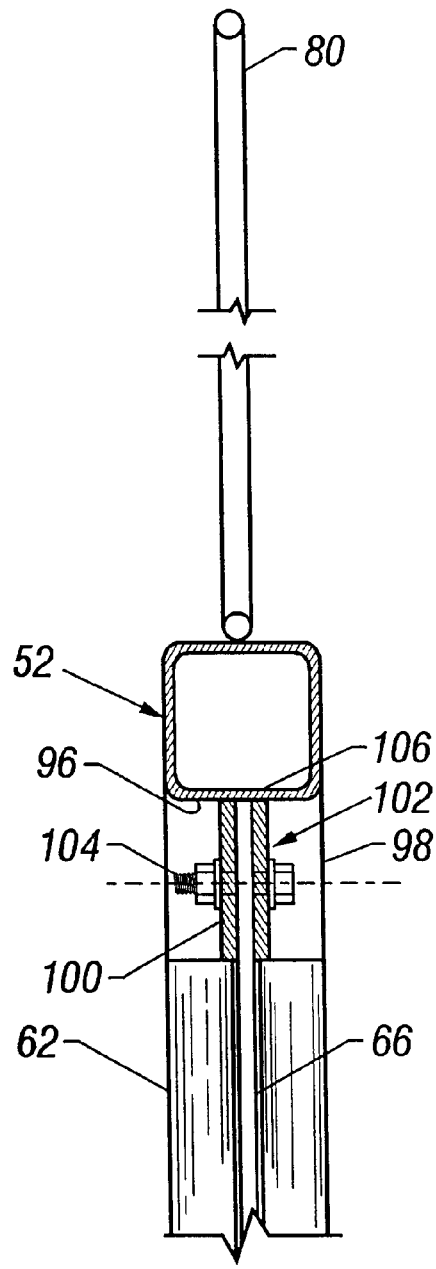
FIG. 6 is a cross-sectional view taken along the line C–C' of FIG. 3.

FIG. 6 illustrates the attachment of panel 66 to the top member 52 of supporting frame 51. Panel 66 is attached to the bottom portion 96 of top member 52 of supporting frame 51 by a double batten section 98. Double batten section 98 includes an outer batten 100, which is disposed beneath and runs parallel to the top edge 52 of supporting frame 51, and an inner batten 102, which is disposed parallel to outer batten 100. Inner batten 102 is spaced apart from outer batten 100 by a distance approximately equal to the thickness of panel 66. A fastener 104 attaches inner batten 102 to outer batten 100 through panel 66. Fastener 104 may be, for example a ¼" bolt with a matching washer. Outer batten 100 and inner batten 102 are preferably constructed from type 316 stainless steel, and are preferably each equal in thickness to panel 66. Outer batten 100 and inner batten 102 are attached to the bottom portion 96 of the top member 52 of support frame 41 by welds 106. Outer batten 100 and inner batten 102 are preferably at least 2 inches deep, so that a sufficient length of panel 66 may be held in place between them.

Advantageously with the design of the present invention, sudden, high magnitude hydrodynamic loading on the feedwell resulting from, for example, seismic events, does not damage the feedwell. Instead, when a wave within a clarifier hits the feedwell, the flexible panel disengages from the seal members along the bottom and side edges, permitting water to pass through the feedwell without damaging the feedwell. In so doing, the flexible panel does not become disengaged from the stiffening frames.

To bring the clarifier back in service, operators merely re-install the pressure relief doors 50 within supporting frame 51. This may be done, for example, by using a crane or winch to cooperate with triangular shaped rod 80 attached to the top member 52 of the supporting frame 51 of each door 50 and pulling upward, completely removing pressure relief door 50 from feedwell frame 41. Flexible panel 66 is then manually tucked backed into the sealing members 71 along the bottom, left, and right edges of the supporting frame 51. Pressure relief door 50 is then lowered between adjacent guide channels 47 into space 48, as illustrated in FIG. 2B. This procedure is then repeated for each pressure relief door requiring re-seating of the panel within the sealing members. Advantageously, the process just described may be carried out in a few hours by a crew of three operators, does not require draining of the clarifier, and perhaps most importantly, does not result in untreated water or wastewater being discharged to the receiving water for the facility. Moreover, since the clarifier feedwell is protected from sudden, high magnitude hydrodynamic loads, repair or replacement of the feedwell drive unit and the sludge rakes which rotate with the feedwell will not be required.

The above description of embodiments of this invention is intended to be illustrative and not limiting. For example, one of ordinary skill in the art would appreciate that seal members 71 could be placed along any three of the four edges defining the supporting frame 51, and need not necessarily be the left edge, bottom edge and right edge. In addition, the doors and panels need not be rectangular. Other embodiments of this invention will be obvious to those of ordinary skill in the art in view of the above disclosure.

We claim:

1. A clarifier feedwell for a wastewater treatment system comprising:
   a feedwell frame; and
   at least one pressure relief door which is slidably inserted into the feedwell frame, said pressure relief door comprising:
      a supporting frame defining an opening;
         a flexible panel of resilient material disposed in said opening and having outer and inner surfaces, a first edge of said panel being attached to a first portion of said supporting frame and remaining edges of said panel being releasably engaged by seal members with other portions of said supporting frame such that said panel occupies substantially the entire area of said opening; and
      at least one stiffening frame disposed on said panel.

2. The clarifier feedwell of claim 1, wherein said opening and said panel are rectangular, said supporting frame having top, bottom and side members, said panel having top, bottom and side edges, said top edge of the panel being fixedly attached to said top member of said frame and bottom and side edges of said panel being releasably engaged with said bottom and side members of said supporting frame, respectively.

3. The clarifier feedwell of claim 1, wherein said seal members are made from an elastomer.

4. The clarifier feedwell of claim 1, wherein said resilient material is fabric reinforced neoprene.

5. The clarifier feedwell of claim 1, wherein said supporting frame and said stiffening frames are of stainless steel.

6. The clarifier feedwell of claim 1, further comprising:
- a rod attached to said top edge of said supporting frame, said rod being operable to cooperate with an external device for removal of said pressure relief door from said feedwell frame.

7. The clarifier feedwell of claim 6, wherein said rod is triangular and engages an edge of said supporting frame at two points.

8. The clarifier feedwell of claim 6, wherein said rod is attached to said top edge of said supporting frame by welds.

9. The clarifier feedwell of claim 1, wherein said stiffening frame is made from alloys of steel.

10. The clarifier feedwell of claim 1, wherein the at least one stiffening frame comprises:
- a channeled section disposed on said outer surface of said panel; and
- a flat bar section disposed on said inner surface of said panel;
- said channeled section being fastened to said flat bar section through said panel.

11. The clarifier feedwell of claim 10, wherein said channeled section is fastened to said flat bar section by riveting.

12. The clarifier feedwell of claim 10, wherein said channeled section is connected to said flat bar section by bolting.

13. The clarifier feedwell of claim 1, wherein said resilient material and said seal members have hardness values that are approximately equal.

14. The clarifier feedwell of claim 1, wherein said resilient material and said seal members have a durometer measurement (hardness) of 60 shor A.

15. The clarifier feedwell of claim 1, wherein said stiffening frames are about one foot in height, and said pressure relief door is about four feet in width.

16. The clarifier feedwell of claim 1, wherein said panel is attached to a bottom portion of said top edge of said supporting frame by a double batten section, said double batten section comprising:
- an outer batten disposed beneath said top edge of said supporting frame;
- an inner batten disposed parallel to said outer batten, and spaced apart from said outer batten by said panel; and
- a fastener attaching said inner batten to said outer batten through said resilient panel.

17. The clarifier feedwell of claim 16, wherein said double batten section is attached to said bottom portion of said top edge of said supporting frame by welds.

* * * * *